TRANSISTOR BISTABLE DEVICES WITH NON-VOLATILE MEMORY

Filed Aug. 27, 1964 2 Sheets-Sheet 1

INVENTOR,
IRA R. MARCUS

Harry M. Saragovitz,
BY Edward J. Kelly, Herbert Berl
& J. D. Edgerton
ATTORNEYS INVENTOR,
IRA R. MARUS
BY Harry M. Saragovitz, Edward J. Kelly, Herbert Berl & J. D. Edgerton
ATTORNEYS

United States Patent Office 3,418,646
Patented Dec. 24, 1968

3,418,646

TRANSISTOR BISTABLE DEVICES WITH NON-VOLATILE MEMORY

Ira R. Marcus, Wheaton, Md., assignor to the United States of America as represented by the Secretary of the Army Filed Aug. 27, 1964, Ser. No. 392,667
4 Claims. (Cl. 340—174)

ABSTRACT OF THE DISCLOSURE

A transistor bistable device having a non-volatile memory which may be set to one of two stable states without a supply voltage being applied and which will assume the set state upon application of a supply voltage. While in operation with a supply voltage applied, the device will return to the state it was in just prior to an interruption in the supply voltage upon reapplication of the supply voltage.

The invention described herein may be manufactured and used by or for the Government of the United States of America for governmental purposes without the payment to me of any royalty thereon.

This invention relates generally to bistable transistor circuits and more particularly to a transistor bistable device having a non-volatile memory which may be set to one of two stable states without a supply voltage being applied and which will assume the set state upon application of a supply voltage and which while in operation with a supply voltage applied will return to the state it was in just prior to an interruption in the supply voltage upon reapplication of the supply voltage.

In the fields of data processing and control, there are many known transistorized bistable devices. These devices have wide applications in various types of counters, registers, and accumulators. Most of these devices, however, suffer one principal disadvantage, and that is information can neither be stored nor retained in the absence of the supply voltage or in the event of an interruption in the supply voltage. Various procedures and circuits have been devised in order to circumvent this disadvantage. Typically in the case of data processing and computing systems, the procedure in the event of a power failure or interruption is to reset all the bistable devices in the system to some initial or known intermediate state and begin the system operation anew from that point. Clearly, this procedure can not make up the time lost in system operation up to the time of power failure. Furthermore, the procedure is of no avail in a control system which typically operates with a limited duty cycle or pulsed power supply. A few circuits have been devised which employ transistor bistable circuits modified by the addition of ferromagnetic cores. The ferromagnetic cores have the advantage of permitting setting and storage of information without a supply voltage. When the transistor bistable circuits are modified to include a ferromagnetic core, information may be read into and maintained in these circuits without a supply voltage being applied. Such circuits prevent the loss of valuable time when incorporated in large data processing systems and may also be used effectively in limited duty cycle control systems; however, the known transistor bistable circuits which incorporate ferromagnetic cores to provide a non-volatile memory characteristic do not have the high pulse repetition rates required by modern data processing and computer systems and are not adaptable to microminiaturization techniques required in many specialized control system applications. This is because the known circuits rely on the high switching impedance of the ferromagnetic core for operation. Since the switching impedance of a ferromagnetic core varies directly with its size and directly with the square of the number of turns, the use of small ferromagnetic cores is precluded. In addition, a high impedance switching core profoundly affects the high frequency response of the circuit.

It is therefore an object of the present invention to provide a transistorized bistable device with a non-volatile memory which will retain information without a supply voltage being applied and which uses small, low-impedance ferromagnetic memory devices permitting ready adaptation of microminiaturization techinques.

It is another object to provide a high pulse repetition rate transistorized bistable multivibrator circuit having a low-impedance ferromagnetic memory device incorporated therein permitting setting and storage of information without the application of a supply voltage.

It is a further object of the instant invention to provide a transistor latch circuit characterized by having a ferromagnetic memory device of small physical size incorporated therein.

According to the present invention, the foregoing and other objects are attained by providing a transistor bistable circuit connected to assume a first of two stable states when a supply voltage is applied, a ferromagnetic memory device having at least one sensing line connected to the transistor bistable circuit in such a way that a voltage pulse generated in the sensing line by the changing of the ferromagnetic memory device from a first state of magnetic remanence to a second state of magnetic remanence causes the transistor bistable device to assume a second of two stable states, and an interrogation circuit connected to the ferromagnetic memory device to drive the memory device into its second state of magnetic remanence upon the application of a supply voltage.

The specific nature of the invention, as well as other objects, aspects, uses and advantages thereof, will clearly appear from the following description and from the accompanying drawings in which.

Figure 1:
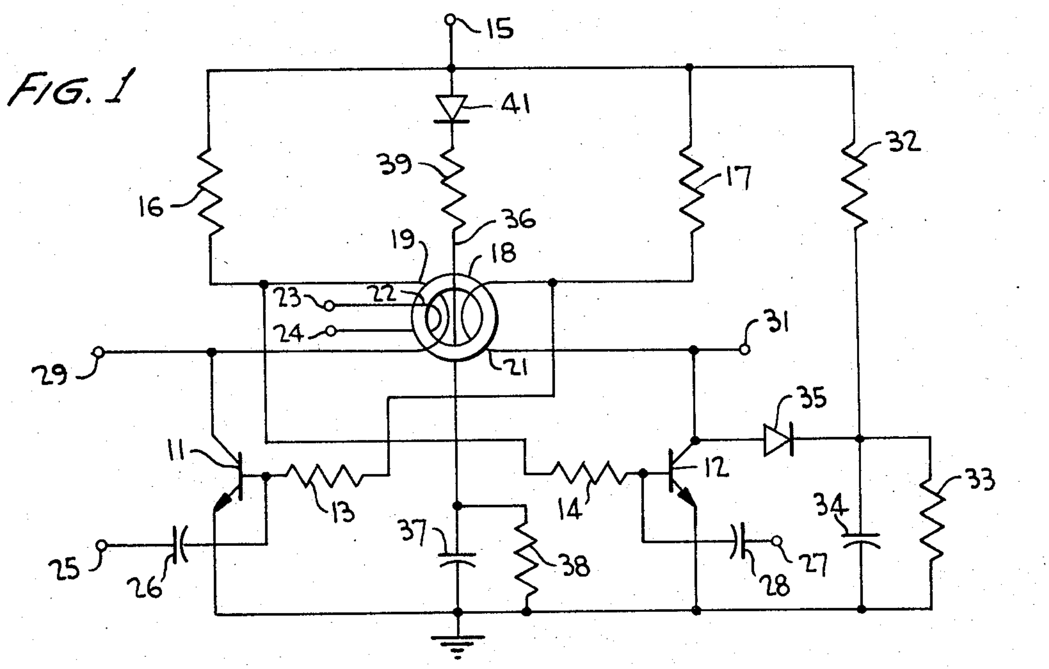
FIG. 1 is a schematic diagram of one embodiment of the present invention showing the modification of a bistable multivibrator circuit to include a ferromagnetic memory device.

Referring now to the drawings, and more particularly to FIG. 1 wherein the base of transistor 11 is connected to the collector of transistor 12 by way of cross-coupling resistor 13, and the base of transistor 12 is connected to the collector of transistor 11 by way of cross-coupling resistor 14 thereby forming a bistable multivibrator. The collectors of transistors 11 and 12 are connected to a source of supply voltage at terminal 15 through load resistors 16 and 17, respectively. The ferromagnetic memory device 18 is here represented as being a conventional ferromagnetic core. In the practice of this invention, memory device 18 may be a microminiature ferromagnetic core or a thin-film ferromagnetic spot of the types being employed in modern high-speed data processing and computer memory systems. The core 18 has two sensing windings 19 and 21 (or lines in the case of a thin-film ferromagnetic spot). Winding 19 is connected between the collector of transistor 11 and cross-coupling resistor 14, while winding 21 is connected between the collector of transistor 12 and the cross-coupling resistor 13. The set winding 22 is connected to core-set terminals 23, 24 and may be used to set the core 18 in either of two states of magnetic remanence by applying a current pulse in the appropriate direction to the winding. When a supply voltage is applied, the transistor bistable multivibrator may be set in either of two stable states by appropriately applying a voltage pulse to the set terminal 25 which is coupled to the base of transistor 11 by capacitor 26 or to the set terminal 27 which is coupled to the base of transistor 12 by capacitor 28. Outputs from the device are taken from the collectors of transistors 11 and 12 at terminals 29 and 31, respectively. A clamping circuit consisting of resistors 32 and 33 connected in series across the supply voltage to form a voltage divider and a clamping capacitor 34 shunting resistor 33 is connected to transistor 12 by diode 35. Diode 35 is connected between the collector of transistor 12 and the junction of resistors 32 and 33. At the instant the supply voltage is turned on, the clamping capacitor 34 appears as a short circuit and diode 35 is forward biased causing the collector of transistor 12 to momentarily go to ground potential. This prevents transistor 11 from conducting and permits transistor 12 to become conducting as the voltage across capacitor 34 increases until diode 35 is back-biased. Resistor 33 provides a discharge path for capacitor 34 when the supply voltage is interrupted. The core 18 is additionally provided with an interrogation winding 36 which is part of an interrogation circuit consisting of capacitor 37 connected in parallel with leakage resistor 38 connected to one end of winding 36 and a current limiting resistor 39 connected in series with blocking diode 41 connected to the other end of winding 36. The interrogation circuit is connected across the supply voltage. At the instant the supply voltage is turned on, the capacitor 37 appears as a short circuit. As a result a current pulse which decays exponentially is generated in interrogation winding 36. The diode 41 prevents the capacitor 37 from discharging through the power supply when the voltage supply is turned off. When the voltage supply is turned off or interrupted, capacitor 37 discharges through leakage resistor 38 and is ready to generate another current pulse when the power supply is again turned on.

A clear understanding of the device shown in FIG. 1 may be had from the following examples. First, the device is defined as being in the binary zero state when transistor 12 is conducting. The core 18 is set to its second state of magnetic remanence, corresponding to the zero state of the device, by applying a positive current pulse to core-set terminal 23. Upon application of the supply voltage, core 18 is pulsed toward its second state of magnetic remanence by the interrogation circuit. Since core 18 is already in its second state of magnetic remanence, no voltage other than a noise pulse is induced in the sensing windings 19 and 21. The clamping circuit causes transistor 12 to conduct, and the device assumes the binary zero state. The collector current of transistor 12 flows through sensing winding 21 driving core 18 into its second state of magnetic remanence. Now, with the supply voltage off the core 18 is set to its first state of magnetic remanence, corresponding to the binary one state of the device, by applying a positive current pulse to core-set terminal 24. Upon application of the supply voltage, the clamping circuit again tends to cause transistor 12 to conduct; however, the interrogation circuit causes core 18 to change to its second state of magnetic remanence causing voltages to be induced in sensing windings 19 and 21. A positive voltage pulse appears at the base of transistor 11 tending to make it conduct, and a negative voltage pulse appears at the base of transistor 12 tending to prevent it from conducting. The switching time of the core 18 is designed to be longer than the time constant of resistor 32 and capacitor 34 of the clamping circuit; therefore, transistor 11 conducts, and the device is in the binary one state. The collector current of transistor 11 flows through the sensing winding 19 returning the core 18 to its first state of magnetic remanence. If the supply voltage is interrupted and reapplied in either of these examples, the clamping circuit and interrogation circuit operate as before to cause the device to assume the state it was in just prior to the interruption.

Figure 2:
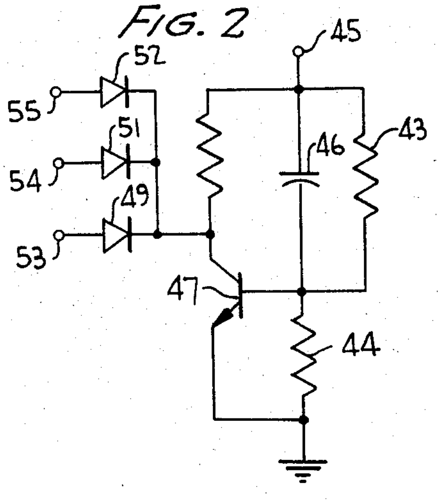
FIG. 2 is a schematic diagram of an improved clamping circuit which can be used for a plurality of transistor bistable devices like the one shown in FIG. 1.

FIG. 2 shows an improved clamping circuit which may be used in place of the simple RC clamping circuit shown in FIG. 1. A resistive voltage divider consisting of resistors 43 and 44 connected in series is connected across the supply voltage which is applied at terminal 45. A clamping capacitor 46 is connected in parallel with resistor 43. A transistor 47 having its collector connected to the supply voltage at terminal 45 through load resistor 48 has its base connected to the junction of resistors 43 and 44. The base to emitter path of transistor 47 is connected in parallel with resistor 44. One clamping circuit may be used for a plurality of bistable multivibrators. The collector of the second transistor in each bistable multivibrator is connected to the collector of transistor 47 through a diode. Three diodes 49, 51, and 52 which may be connected to three bistable multivibrators at terminals 53, 54, and 55, respectively, are illustrated. When the power supply is turned on, the clamping capacitor appears as a short circuit causing a high positive voltage to appear at the base of transistor 47 biasing it into conduction. The transistor 47 remains conductive until the voltage across the capacitor 46 rises to the point where transistor 47 is biased into non-conduction. The resistor 43 serves as a leakage resistor to discharge capacitor 46 when the voltage supply is interrupted or turned off. This clamping circuit has the advantage over the simpler RC clamping circuit shown in FIG. 1 in that it clamps to ground for a finite time while the RC clamping circuit rises exponentially from ground.

While in both FIGS. 1 and 2 NPN transistors have been illustrated, it is to be understood that PNP transistors may also be used with equal effectiveness by appropriately changing the polarity of the supply voltage and reversing the polarity of the diodes.

Figure 3:
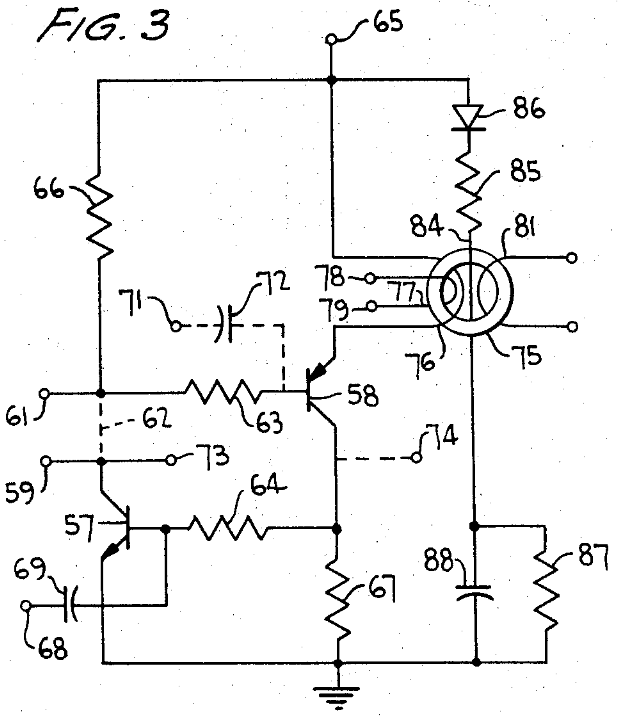
FIG. 3 is a schematic diagram of another embodiment of the invention showing the modification of a transistor latch circuit to include a ferromagnetic memory device.

A second illustrative embodiment of the present invention is shown in FIG. 3. Here complementary transistors 57 and 58 are connected to form a latch circuit. More specifically, the collector of transistor 57 is connected through terminals 59 and 61 (or alternately through wire 62) and cross-coupling resistor 63 to the base of transistor 58, and the collector of transistor 58 is connected through cross-coupling resistor 64 to the base of transistor 57. The collector of transistor 57 is connected to a supply voltage applied at terminal 65 through load resistor 66, while the collector of transistor 58 is connected to the supply voltage return or ground through load resistor 67. The latch circuit has two stable states: either both transistors are conducting or they are not. The latch circuit may be set to the conducting state by applying a positive voltage pulse to terminal 68 which is coupled to the base of transistor 57 by capacitor 69. Alternatively, the latch circuit may be set to the conducting state by applying a negative voltage pulse to terminal 71 which is coupled to the base of transistor 58 by capacitor 72. The latch circuit may be reset to the non-conducting state by either applying a negative voltage pulse to terminal 68 or a positive voltage pulse to terminal 71. Outputs of the latch circuit are conveniently taken at terminals 73 or 74 which are connected to the collectors of transistors 57 and 58, respectively. Since the latch circuit inherently assumes the non-conducting state when the supply voltage is turned on, no clamping circuit is required. The ferromagnetic memory device 75 (again illustrated as a ferromagnetic core) is connected to the emitter circuit of transistor 58 by sensing winding 76. Winding 77 connected to core-set terminals 78 and 79 is provided to permit setting the core 75 in one of its two states of magnetic remanence. A second sensing winding 81 with terminals 82 and 83 is provided when a plurality of latch circuits are to be cascaded as will be explained in more detail later. The interrogation circuit consisting of interrogation winding 84, current limiting resistor 85, blocking diode 86, interrogation capacitor 88, end leakage resistor 87 is exactly the same and operates in the same manner as the interrogation circuit shown in FIG. 1.

Consider the following examples of the operation of latch circuit shown in FIG. 3. The latch circuit is defined as being in the binary one state when it is conducting. With the supply voltage off, the core 75 is set in its second state of magnetic remanence, corresponding to the binary zero state in the latch circuit, by applying a positive current pulse to terminal 78 of core-set winding 77. Now when the supply voltage is turned on, the interrogation circuit generates an interrogation pulse which drives the core 75 into its second state of magnetic remanence. Since the core 75 does not change its state under these conditions, no voltage is generated in sensing winding 76, and the latch circuit assumes the binary zero or non-conducting state. Again with the supply voltage off, the core 75 is set to its first state of magnetic remanence, corresponding to binary one, by applying a positive current pulse to terminal 79. When the voltage supply is turned on, the interrogation circuit drives the core 75 into its second state of magnetic remanence. The change in states of the core 75 induces a positive voltage pulse in sensing winding 76 which forward biases transistor 58 causing the latch circuit to conduct. The emitter current of transistor 58 flowing in sensing winding 76 drives core 75 back into its first state of magnetic remanence. If the supply voltage is interrupted and reapplied, the interrogation circuit operates as before, and the latch circuit assumes the state it was in just prior to the interruption.

Figure 4:
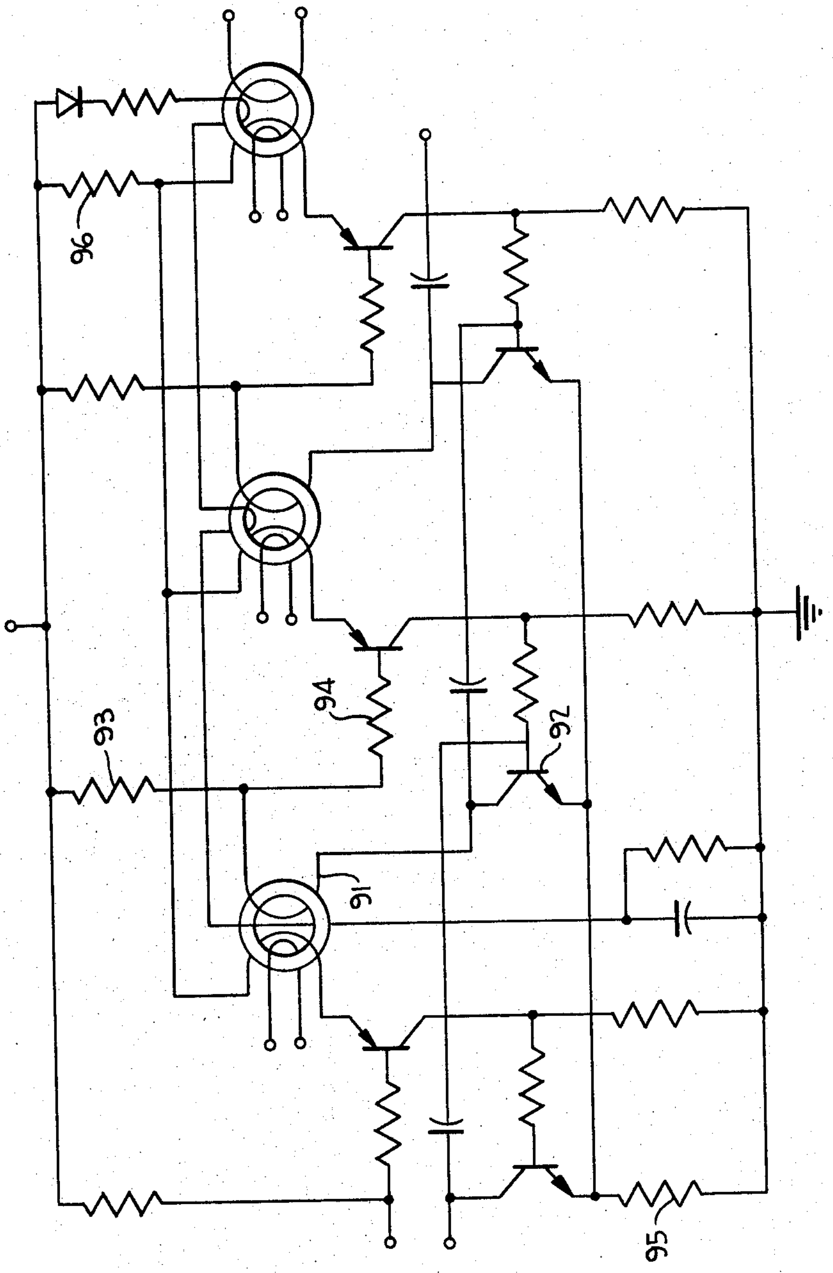
FIG. 4 is a schematic diagram of a plurality of latch circuits like the one shown in FIG. 3 connected in cascade to form a ring counter circuit and having a common interrogation circuit.

FIG. 4 provides one illustration of how a plurality of latch circuits of the type shown in FIG. 3 may be cascaded. In the particular example shown, the latch circuits are cascaded to form a ring counter. The second sensing winding on the core of each stage is connected in the collector circuit of the first transistor of the next succeeding stage. For example, sensing winding 91 is connected between the collector of transistor 92 and its load resistor 93 and between the collector of transistor 92 and cross-coupling resistor 94. The emitters of all the NPN transistors share a common emitter resistor 95, and the emitters of all the PNP transistors share a common emitter resistor 96. The purpose of these resistors is to insure that only one stage is conducting at any one time. When one stage is conducting, the voltage drop across resistors 95 and 96 back biases all the remaining transistors and holds them non-conductive. The stages are coupled by a capacitor between either collector of one stage and the base of the corresponding transistor of the next succeeding stage. Here, this has been illustrated between the NPN transistors. Moving the position of the conducting stage is accomplished by causing the conducting stage to become non-conducting and allowing the next stage to be pulsed to conduction by the coupling capacitor. This is done by applying a positive voltage pulse on the common emitter line of the NPN transistors or a negative voltage pulse on the common emitter line of the PNP transistors. The only restriction is that the coupling pulse has to be longer than the pulses applied to the common emitter lines otherwise all the stages will become non-conducting and remain non-conducting. Assume that the first stage shown is conducting. A positive voltage pulse applied to the common emitter line of the NPN transistors causes the NPN transistor of the first stage to be back-biased. As a result, the first stage becomes non-conductive. A positive voltage pulse is coupled to the base of transistor 92 causing the second stage to become conductive. The collector current of transistor 92 flows through sensing winding 91 driving the core of the first stage into its second or zero state of magnetic remanence while the emitter current of the PNP transistor of the second stage drives the core of the second stage into its first or one state of magnetic remanence. A shift register may be made by deleting both the resistors 95 and 96 thereby allowing more than one stage to be conducting at one time. So that adjacent stages may be conducting concomitantly, the ampere-turns of the second sensing winding of each stage should be one half the ampere-turns of the first sensing winding.

As shown in FIG. 4, a plurality of stages may use a common interrogation circuit simply by connecting the interrogation winding of all the stages in series. This technique is equally applicable to a plurality of bistable multivibrators like that shown in FIG. 1. In using a common interrogation circuit it is not necessary that the several bistable devices be connected in cascade. They may be in independent circuits.

It will be apparent that the embodiments shown are only exemplary and that various modifications can be made in construction and arrangement within the scope of the invention as defined in the appended claims.

I claim as my invention:

1. A transistor bistable device having a non-volatile memory which may be set to one of two stable states without a supply voltage being applied and which will assume the set state upon application of a supply voltage and which while in operation with a supply voltage applied will return to the state it was in just prior to an interruption in the supply voltage upon reapplication of the supply voltage, comprising:

(a) a transistor bistable circuit connected to assume a first of two stable states upon application of a supply voltage, said circuit including a first and second transistors each having a collector, a base, and an emitter;

(b) a ferromagnetic memory device having a rectangular hysteresis loop permitting two states of magnetic remanence;

(c) a first and second sensing lines on said ferromagnetic memory device in which a voltage pulse is generated when said ferromagnetic memory device changes from one state of magnetic remanence to another, said transistor bistable circuit connected to said sensing line and being responsive to a voltage pulse generated therein when said ferromagnetic memory device changes from a first state of magnetic remanence to a second state of magnetic remanence to assume the second of said transistor bistable circuit's two stable states;

(d) first and second cross-coupling networks connecting the collector of said first transistor with the base of said second transistor and connecting the collector of said second transistor with the base of said first transistor to form a bistable multivibrator, said first and second cross-coupling networks including said first sensing line and said second sensing line, respectively;

(e) a clamping circuit connected to said second transistor to cause said transistor bistable circuit to assume a first of two stable states by causing said second transistor to conduct upon application of a supply voltage, and (f) an interrogation circuit connected to said ferromagnetic memory device to drive said ferromagnetic memory device into the second state of magnetic remanence upon the application of a supply voltage.

2. A transistor bistable device as defined in claim 1 wherein said clamping circuit includes:

(a) a resistive voltage divider across which a source of supply voltage is to be applied, said resistive voltage divider comprising first and second series connected resistors, (b) a diode connected between the collector of said second transistor and the junction of said first and second resistors, and (c) a capacitor connected across said second resistor and substantially in parallel with the collector to emitter path of said second transistor.

3. In a plurality of transistor bistable devices as defined in claim 1, a common clamping circuit comprising:

(a) a resistive voltage divider across which a source of supply voltage is to be applied, said resistive voltage divider comprising first and second resistors, (b) a clamping transistor having a collector, a base, and an emitter, said base being connected to the junction of said first and second resistors and the base to emitter path of said clamping transistor being connected in parallel with said first resistor, (c) a capacitor connected across said second resistor, and (d) a plurality of diodes each connecting the collector of the second transistor of a transistor bistable device to the collector of said clamping transistor, the collector to emitter paths of each of the second transistors in each of the plurality of transistor bistable devices being substantially in parallel with collector to emitter path of said clamping transistor.

4. A plurality of transistor bistable devices as defined in claim 1, each of said plurality of transistor bistable devices further including a second sensing line on respective ferromagnetic memory devices, said plurality of transistor bistable devices being connected in cascade by connecting said second sensing line in each transistor bistable device to the collector of the first transistor in the next succeeding transistor bistable device to cause the base-collector junction of said first transistor to be backward biased when a voltage pulse is generated in said second sensing line by said ferromagnetic memory device changing from a first state of magnetic remanence to a second state of magnetic remanence.

References Cited

UNITED STATES PATENTS

| | | | |
|---|---|---|---|
| 3,151,255 | 9/1964 | Halpin | 307—88.5 |
| 3,171,969 | 3/1965 | Sowers | 340—174 |
| 3,214,606 | 10/1965 | Wilson | 307—88.5 |

STANLEY M. URYNOWICZ, *Primary Examiner.*

B. L. HALEY, *Assistant Examiner.*

U.S. Cl. X.R.

307—88.5